US009754571B2

(12) United States Patent
Salazar et al.

(10) Patent No.: US 9,754,571 B2
(45) Date of Patent: Sep. 5, 2017

(54) CONTINUOUS PITCH-CORRECTED VOCAL CAPTURE DEVICE COOPERATIVE WITH CONTENT SERVER FOR BACKING TRACK MIX

(71) Applicant: Smule, Inc., San Francisco, CA (US)

(72) Inventors: Spencer Salazar, San Francisco, CA (US); Rebecca A. Fiebrink, Timmins (CA); Ge Wang, Palo Alto, CA (US); Mattias Ljungstrom, Berlin (DE); Jeffrey C. Smith, Atherton, CA (US); Perry R. Cook, Jacksonville, OR (US)

(73) Assignee: Smule, Inc., San Francisco, CA (US)

( * ) Notice: Subject to any disclaimer, the term of this patent is extended or adjusted under 35 U.S.C. 154(b) by 24 days.

(21) Appl. No.: 14/720,320

(22) Filed: May 22, 2015

(65) Prior Publication Data

US 2016/0005416 A1 Jan. 7, 2016

Related U.S. Application Data

(63) Continuation of application No. 12/876,131, filed on Sep. 4, 2010, now Pat. No. 9,058,797.
(Continued)

(51) Int. Cl.
*G10H 1/02* (2006.01)
*G10H 1/36* (2006.01)
(Continued)

(52) U.S. Cl.
CPC ............. *G10H 1/366* (2013.01); *G06F 3/165* (2013.01); *G10H 1/368* (2013.01); *G10L 21/013* (2013.01);
(Continued)

(58) Field of Classification Search
CPC ............. G10H 1/366; G10H 2210/066; G10H 2220/011; G10L 21/013
See application file for complete search history.

(56) References Cited

U.S. PATENT DOCUMENTS 4,688,464 A 8/1987 Gibson et al.
5,231,671 A 7/1993 Gibson et al.
(Continued)

FOREIGN PATENT DOCUMENTS

GB 2493470 2/2013

OTHER PUBLICATIONS

Antares, "Auto-Tune Real time Auto-tune vocal effect and pitch correcting plug-in", Antares Audio Technologies, 2008.*
(Continued)

*Primary Examiner* — Jialong He
(74) *Attorney, Agent, or Firm* — Haynes and Boone, LLP

(57) ABSTRACT

Techniques have been developed to facilitate (1) the capture and pitch correction of vocal performances on handheld or other portable computing devices and (2) the mixing of such pitch-corrected vocal performances with backing tracks for audible rendering on targets that include such portable computing devices and as well as desktops, workstations, gaming stations, even telephony targets. Implementations of the described techniques employ signal processing techniques and allocations of system functionality that are suitable given the generally limited capabilities of such handheld or portable computing devices and that facilitate efficient encoding and communication of the pitch-corrected vocal performances (or precursors or derivatives thereof) via wireless and/or wired bandwidth-limited networks for rendering on portable computing devices or other targets.

18 Claims, 5 Drawing Sheets

Related U.S. Application Data

(60) Provisional application No. 61/286,749, filed on Dec. 15, 2009, provisional application No. 61/323,348, filed on Apr. 12, 2010.

(51) Int. Cl.
  *G10L 21/013* (2013.01)
  *G06F 3/16* (2006.01)
  *G10L 21/0356* (2013.01)

(52) U.S. Cl.
  CPC .... *G10L 21/0356* (2013.01); *G10H 2210/251* (2013.01); *G10H 2210/331* (2013.01); *G10H 2220/011* (2013.01); *G10H 2240/125* (2013.01); *G10H 2240/175* (2013.01); *G10H 2240/211* (2013.01); *G10H 2240/251* (2013.01)

(56) References Cited

U.S. PATENT DOCUMENTS

| | | | |
|---|---|---|---|
| 5,301,259 | A | 4/1994 | Gibson et al. |
| 5,477,003 | A | 12/1995 | Muraki et al. |
| 5,641,927 | A | 6/1997 | Pawate |
| 5,719,346 | A | 2/1998 | Yoshida et al. |
| 5,753,845 | A | 5/1998 | Nagata et al. |
| 5,811,708 | A | 9/1998 | Matsumoto |
| 5,817,965 | A * | 10/1998 | Matsumoto ............ G10H 1/366 434/307 A |
| 5,889,223 | A | 3/1999 | Matsumoto |
| 5,902,950 | A | 5/1999 | Kato et al. |
| 5,939,654 | A | 8/1999 | Anada |
| 5,966,687 | A | 10/1999 | Ojard |
| 5,974,154 | A | 10/1999 | Nagata et al. |
| 6,121,531 | A | 9/2000 | Kato |
| 6,300,553 | B2 | 10/2001 | Kumamoto |
| 6,307,140 | B1 | 10/2001 | Iwamoto |
| 6,336,092 | B1 | 1/2002 | Gibson et al. |
| 6,353,174 | B1 | 3/2002 | Schmidt et al. |
| 6,369,311 | B1 | 4/2002 | Iwamoto |
| 6,535,269 | B2 | 3/2003 | Sherman et al. |
| 6,643,372 | B2 | 11/2003 | Ford et al. |
| 6,653,545 | B2 | 11/2003 | Redmann et al. |
| 6,657,114 | B2 | 12/2003 | Iwamoto et al. |
| 6,661,496 | B2 | 12/2003 | Sherman et al. |
| 6,751,439 | B2 | 6/2004 | Tice et al. |
| 6,816,833 | B1 * | 11/2004 | Iwamoto ................ G10H 1/366 381/61 |
| 6,898,637 | B2 | 5/2005 | Curtin |
| 6,917,912 | B2 | 7/2005 | Chang et al. |
| 6,928,261 | B2 | 8/2005 | Hasegawa et al. |
| 6,971,882 | B1 | 12/2005 | Kumar et al. |
| 6,975,995 | B2 | 12/2005 | Kim |
| 7,003,496 | B2 | 2/2006 | Ishii et al. |
| 7,068,596 | B1 | 6/2006 | Mou |
| 7,096,080 | B2 | 8/2006 | Asada et al. |
| 7,102,072 | B2 | 9/2006 | Kitayama |
| 7,129,408 | B2 | 10/2006 | Uehara et al. |
| 7,164,075 | B2 | 1/2007 | Tada et al. |
| 7,164,076 | B2 | 1/2007 | McHale et al. |
| 7,294,776 | B2 | 11/2007 | Tohgi et al. |
| 7,297,858 | B2 | 11/2007 | Paepcke |
| 7,483,957 | B2 | 1/2009 | Sako et al. |
| 7,606,709 | B2 | 10/2009 | Yoshioka et al. |
| 7,806,759 | B2 | 10/2010 | McHale et al. |
| 7,825,321 | B2 | 11/2010 | Bloom et al. |
| 7,853,342 | B2 | 12/2010 | Redmann |
| 7,899,389 | B2 | 3/2011 | Magnum |
| 7,928,310 | B2 | 4/2011 | Georges et al. |
| 7,974,838 | B1 * | 7/2011 | Lukin ................... G10H 1/366 704/207 |
| 7,989,689 | B2 | 8/2011 | Sitrick et al. |
| 8,290,769 | B2 | 10/2012 | Taub et al. |
| 8,315,396 | B2 | 11/2012 | Schreiner et al. |
| 8,772,621 | B2 | 7/2014 | Wang et al. |
| 8,868,411 | B2 | 10/2014 | Cook et al. |
| 8,983,829 | B2 | 3/2015 | Cook et al. |
| 8,996,364 | B2 | 3/2015 | Cook et al. |
| 9,082,380 | B1 | 7/2015 | Hamilton et al. |
| 2002/0004191 | A1 | 1/2002 | Tice et al. |
| 2002/0032728 | A1 | 3/2002 | Sako et al. |
| 2002/0051119 | A1 | 5/2002 | Sherman et al. |
| 2002/0056117 | A1 | 5/2002 | Hasegawa et al. |
| 2002/0177994 | A1 | 11/2002 | Chang et al. |
| 2003/0014262 | A1 | 1/2003 | Kim |
| 2003/0117531 | A1 | 6/2003 | Rovner et al. |
| 2003/0164924 | A1 | 9/2003 | Sherman et al. |
| 2004/0159215 | A1 | 8/2004 | Tohgi et al. |
| 2004/0263664 | A1 | 12/2004 | Aratani et al. |
| 2005/0123887 | A1 | 6/2005 | Joung et al. |
| 2005/0182504 | A1 | 8/2005 | Bailey et al. |
| 2005/0252362 | A1 | 11/2005 | McHale et al. |
| 2006/0165240 | A1 | 7/2006 | Bloom et al. |
| 2006/0206582 | A1 | 9/2006 | Finn |
| 2007/0028750 | A1 | 2/2007 | Darcie et al. |
| 2007/0065794 | A1 | 3/2007 | Mangum |
| 2007/0098368 | A1 | 5/2007 | Carley et al. |
| 2007/0150082 | A1 | 6/2007 | Yang et al. |
| 2007/0245881 | A1 | 10/2007 | Egozy et al. |
| 2007/0245882 | A1 | 10/2007 | Odenwald |
| 2007/0250323 | A1 | 10/2007 | Dimkovic et al. |
| 2007/0260690 | A1 | 11/2007 | Coleman |
| 2007/0287141 | A1 | 12/2007 | Milner et al. |
| 2007/0294374 | A1 | 12/2007 | Tamori |
| 2008/0033585 | A1 | 2/2008 | Zopf |
| 2008/0105109 | A1 | 5/2008 | Li et al. |
| 2008/0156178 | A1 | 7/2008 | Georges et al. |
| 2008/0184870 | A1 | 8/2008 | Toivola |
| 2008/0190271 | A1 | 8/2008 | Taub et al. |
| 2008/0312914 | A1 | 12/2008 | Rajendran et al. |
| 2009/0003659 | A1 | 1/2009 | Forstall et al. |
| 2009/0038467 | A1 | 2/2009 | Brennan |
| 2009/0106429 | A1 | 4/2009 | Siegal et al. |
| 2009/0107320 | A1 | 4/2009 | Willacy et al. |
| 2009/0164034 | A1 | 6/2009 | Cohen |
| 2009/0165634 | A1 | 7/2009 | Mahowald |
| 2009/0317783 | A1 | 12/2009 | Noguchi |
| 2010/0087240 | A1 | 4/2010 | Egozy et al. |
| 2010/0126331 | A1 | 5/2010 | Golovkin et al. |
| 2010/0142926 | A1 | 6/2010 | Coleman |
| 2010/0192753 | A1 | 8/2010 | Gao et al. |
| 2010/0203491 | A1 | 8/2010 | Yoon |
| 2010/0255827 | A1 | 10/2010 | Jordan |
| 2010/0326256 | A1 | 12/2010 | Emmerson |
| 2011/0126103 | A1 | 5/2011 | Cohen |
| 2011/0144981 | A1 | 6/2011 | Salazar et al. |
| 2011/0144982 | A1 | 6/2011 | Salazar et al. |
| 2011/0144983 | A1 | 6/2011 | Salazar et al. |
| 2011/0203444 | A1 | 8/2011 | Yamauchi |

OTHER PUBLICATIONS

Wang, Ge, "Designing Smule's iPhone Ocarina," New Interfaces for Musical Experssion (NIME09), Jun. 3-6, 2009, Pittsburg, PA, 5 pages.

International Search Report and Written Opinion mailed in International Application No. PCT/US1060135 on Feb. 8, 2011, 17 pages.

"Auto-Tune: Intonation Correcting Plug-In." User's Manual. Antares Audio Technologies. 2000. Print. p. 1-52.

Ananthapadmanabha, Tirupattur V. et al. "Epoch Extraction from Linear Prediction Residual for Identification of Closed Glottis Interval." IEEE Transactions on Acoustics, Speech, and Signal Processing, vol. ASSP-27:4. Aug. 1979. Print. p. 309-319.

Atal, Bishnu S. "The History of Linear Prediction." IEEE Signal Processing Magazine. vol. 154, Mar. 2006 Print. p. 154-161.

Baran, Tom. "Autotalent v0.2: Pop Music in a Can!" Department of Electrical Engineering and Computer Science, Massachusetts Institute of Technology. May 22, 2011. Web. <http://web.mit.edu/tbaran/www/autotalent.html>. Accessed Jul. 5, 2011. p. 1-5.

Cheng, M.J. "Some Comparisons Among Several Pitch Detection Algorithms." Bell Laboratories. Murray Hill, NJ. 1976. p. 332-335.

(56) References Cited

OTHER PUBLICATIONS

Clark, Don. "MuseAmi Hopes to Take Music Automation to New Level." The Wall Street Journal, Digits, Technology News and Insights, Mar. 19, 2010 Web. Accessed Jul. 6, 2011 <http://blogs.wsj.com/digits/2010/03/19/museami-hopes-to-takes-music-automation-to-new-level/>.

Conneally, Tim. "The Age of Egregious Auto-tuning: 1998-2009." Tech Gear News—Betanews. Jun. 15, 2009. Web. <http://www.betanews.com/article/the-age-of-egregious-autotuning-19982009/1245090927>. Accessed Dec. 10, 2009.

Gerard, David. "Pitch Extraction and Fundamental Frequency: History and Current Techniques." Department of Computer Science, University of Regina, Saskatchewan, Canada. Nov. 2003. Print. p. 1-22.

International Search Report mailed in International Application No. PCT/US2011/032185 on Aug. 17, 2011, 6 pages.

Johnson, Joel. "Glee on iPhone More than Good—It's Fabulous." Apr. 15, 2010. Web. <http://gizmodo.com/5518067/glee-on-iphone-more-than-goodits-fabulous>. Accessed Jun. 28, 2011. p. 1-3.

Johnson-Bristow, Robert. "A Detailed Analysis of a Time-Domain Formant Corrected Pitch Shifting Alogorithm" AES: An Audio Engineering Society Preprint. Oct. 1993. Print. 24 pages.

Kuhn, William. "A Real-Time Pitch Recognition Alogorithm for Music Applications." Computer Music Journal, vol. 14, No. 3, Fall 1990, Massachusetts Institute of Technology, Print. p. 60-71.

Kumparak, Greg. "Gleeks Rejoice! Smule Packs Fox's Glee Into a Fantastic iPhone Application" MobileCrunch. Apr. 15, 2010. Web. Accessed Jun. 28, 2011 <http://www.mobilecrunch.com/2010/04/15/gleeks-rejoice-smule-packs-foxs-glee-into-a-fantastic-iphone-app/>.

Lent, Keith. "An Efficient Method for Pitch Shifting Digitally Sampled Sounds." Departments of Music and Electrical Engineering, University of Texas at Austin. Computer Music Journal, vol. 13:4, Winter 1989, Massachusetts Institute of Technology. Print. p. 65-71.

McGonegal, Carol A. et al. "A Semiautomatic Pitch Detector (SAPD)." Bell Laboratories. Murray Hill, NJ. May 19, 1975. Print. p. 570-574.

Rabiner, Lawrence R. "On the Use of Autocorrelation Analysis for Pitch Detection." IEEE Transactions on Acoustics, Speech, and Signal Processing. vol. Assp-25:1, Feb. 1977. Print. p. 24-33.

Shaffer, H. and Ross, M. and Cohen, A. "AMDF Pitch Extractor." 85th Meeting Acoustical Society of America. vol. 54:1, Apr. 13, 1973. Print. p. 340.

Trueman, Daniel. et al. "PLOrk: the Princeton Laptop Orchestra, Year 1." Music Department, Princeton University. 2009. Print. 10 pages.

Wortham, Jenna. "Unleash Your Inner Gleek on the iPad." Bits, The New York Times. Apr. 15, 2010. Web. <http://bits.blogs.nytimes.com/2010/04/15/unleash-your-inner-gleek-on-the-ipad/>. Accessed Jun. 28, 2011. p. 1-2.

Ying, Goangshiuan S. et al. "A Probabilistic Approach to AMDF Pitch Detection." School of Electrical and Computer Engineering, Purdue University. 1996. Web. <http://purcell.ecn.purdue.edu/~speechg>. Accessed Jul. 5, 2011. 5 pages.

Baran, Tom, "Autotalent v0.2," Digital Signal Processing Group, Department of Electrical Engineering and Computer Science, Massachusetts Institute of Technology, http://web.mit.edu/tbaran/www/autotalent.html, Jan. 31, 2011.

Gaye, L et al., "Mobile music technology: Report on an emerging community," Proceedings of the International Conference on New Interfaces for Musical Expression, pp. 22-25, Paris, France, 2006.

G. Wang et al., "MoPhO: Do Mobile Phones Dream of Electric Orchestras?" In Proceedings of the International Computer Music Conference, Belfast, Aug. 2008.

Jason Snell, "Best 3D Touch Apps for the iPhone 6s and 6s Plus," Nov. 6, 2015 (retrieved Sep. 26, 2016), Tom's Guide, pp. 1-15, http://www.tomsguide.com/.

* cited by examiner

US 9,754,571 B2

CONTINUOUS PITCH-CORRECTED VOCAL CAPTURE DEVICE COOPERATIVE WITH CONTENT SERVER FOR BACKING TRACK MIX

CROSS-REFERENCE TO RELATED APPLICATION(S)

The present application is a continuation of U.S. patent application Ser. No. 12/876,131, filed Sep. 4, 2010, which claims the benefit of U.S. Provisional Application Nos. 61/286,749, filed Dec. 15, 2009, and 61/323,348, filed Apr. 12, 2010, each of which is incorporated herein by reference.

In addition, the present application is related to the following co-pending applications each filed on even date herewith: (1) U.S. application Ser. No. 12/876,132, entitled "CONTINUOUS SCORE-CODED PITCH CORRECTION" and naming and Salazar, Fiebrink, Wang, Ljungström, Smith and Cook as inventors and (2) U.S. application Ser. No. 12/876,133, entitled "WORLD STAGE FOR PITCH-CORRECTED VOCAL PERFORMANCES" and naming and Salazar, Fiebrink, Wang, Ljungström, Smith and Yang as inventors. Each of the aforementioned co-pending applications is incorporated by reference herein.

BACKGROUND

Field of the Invention

The invention relates generally to capture and/or processing of vocal performances and, in particular, to techniques suitable for use in portable device implementations of pitch correcting vocal capture.

Description of the Related Art

The installed base of mobile phones and other portable computing devices grows in sheer number and computational power each day. Hyper-ubiquitous and deeply entrenched in the lifestyles of people around the world, they transcend nearly every cultural and economic barrier. Computationally, the mobile phones of today offer speed and storage capabilities comparable to desktop computers from less than ten years ago, rendering them surprisingly suitable for real-time sound synthesis and other musical applications. Partly as a result, some modern mobile phones, such as the iPhone™ handheld digital device, available from Apple Inc., support audio and video playback quite capably.

Like traditional acoustic instruments, mobile phones are intimate sound producing devices. However, by comparison to most traditional instruments, they are somewhat limited in acoustic bandwidth and power. Nonetheless, despite these disadvantages, mobile phones do have the advantages of ubiquity, strength in numbers, and ultramobility, making it feasible to (at least in theory) bring together artists for jam sessions, rehearsals, and even performance almost anywhere, anytime. The field of mobile music has been explored in several developing bodies of research. See generally, G. Wang, *Designing Smule's iPhone Ocarina*, presented at the 2009 on *New Interfaces for Musical Expression*, Pittsburgh (June 2009). Moreover, recent experience with applications such as the Smule Ocarina™ and Smule Leaf Trombone: World Stage™ has shown that advanced digital acoustic techniques may be delivered in ways that provide a compelling user experience.

As digital acoustic researchers seek to transition their innovations to commercial applications deployable to modern handheld devices such as the iPhone® handheld and other platforms operable within the real-world constraints imposed by processor, memory and other limited computational resources thereof and/or within communications bandwidth and transmission latency constraints typical of wireless networks, significant practical challenges present. Improved techniques and functional capabilities are desired.

SUMMARY

It has been discovered that, despite many practical limitations imposed by mobile device platforms and application execution environments, vocal musical performances may be captured and continuously pitch-corrected for mixing and rendering with backing tracks in ways that create compelling user experiences. In some cases, the vocal performances of individual users are captured on mobile devices in the context of a karaoke-style presentation of lyrics in correspondence with audible renderings of a backing track. Such performances can be pitch-corrected in real-time at the mobile device (or more generally, at a portable computing device such as a mobile phone, personal digital assistant, laptop computer, notebook computer, pad-type computer or netbook) in accord with pitch correction settings. In some cases, such pitch correction settings code a particular key or scale for the vocal performance or for portions thereof. In some cases, pitch correction settings include a score-coded melody sequence of note targets supplied with, or for association with, the lyrics and/or backing track.

In these ways, user performances (typically those of amateur vocalists) can be significantly improved in tonal quality and the user can be provided with immediate and encouraging feedback. Typically, feedback includes the pitch-corrected vocals themselves and visual reinforcement (during vocal capture) when the user/vocalist is "hitting" the (or a) correct note. In some cases, pitch correction settings are characteristic of a particular artist or of a particular vocal performance of the lyrics in correspondence with the backing track. In this way, tonal characteristics of vocals captured from a user's vocal performance may be altered with effects popularized by artists such as Cher, T-Pain and others. In some cases, the effects include pitch corrections commonly associated with Auto-Tune® audio processing technology available from Antares Audio Technologies. In some cases, alternative audio processing techniques may be employed.

In some cases, captivating visual animations and/or facilities for listener comment and ranking are provided in association with an audible rendering of a vocal performance (e.g., that captured and pitch-corrected at another similarly configured mobile device) mixed with backing instrumentals and/or vocals. Geocoding of captured vocal performances and/or listener feedback may facilitate animations or display artifacts in ways that are suggestive of a performance or endorsement emanating from a particular geographic locale on a user manipulable globe. In this way, implementations of the described functionality can transform otherwise mundane mobile devices into social instruments that foster a unique sense of global connectivity and community.

Accordingly, techniques have been developed for capture and audible rendering of vocal performances on handheld or other portable devices using signal processing techniques and data flows suitable given the somewhat limited capabilities of such devices and in ways that facilitate efficient encoding and communication of such captured performances via ubiquitous, though typically bandwidth-constrained, wireless networks. The developed techniques facilitate capture, pitch-correction and encoding of vocal performances for mixing with backing instrumentals and/or vocals as well as the subsequent rendering of mixed performance on remote devices.

In some embodiments in accordance with the present invention, a method includes using a portable computing device for vocal performance capture, the handheld computing device having a display, a microphone interface and a data communications interface. Responsive to user selection of a backing track, lyrics and timing information corresponding to the backing track are retrieved via the communications interface. At the portable computing device, a first encoding of the backing track is audibly rendered and the retrieved lyrics are concurrently presented on the display in accord with the timing information. A vocal performance of the user is captured and pitch-corrected at the portable computing device in accord with pitch correction settings. An audio encoding of the pitch-corrected vocal performance is transmitted from the portable computing device to a remote server via the communications interface for mixing with a second encoding of the backing track. In some cases, the second encoding is of higher quality or fidelity than the first encoding.

In some embodiments, the method also includes, responsive to the user selection, retrieving the first encoding the backing track via the data communications interface. In some embodiments, the first encoding of the backing track resides in storage local to the portable computing device, and both the retrieving of lyrics and timing information and the transmitting of the audio encoding to the remote server identify the backing track using an identifier ascertainable from the first encoding of the backing track.

In some embodiments, the method further includes the mixing with the second encoding of the backing track, wherein the mixing is performed at the remote server. In some embodiments, the mixing is performed at a remote device at which the resulting mixed performance is audibly rendered.

In some embodiments, the method further includes mixing the pitch-corrected vocal performance into the audible rendering of the backing track at the portable computing device, wherein the resulting mixed performance includes the user's own vocal performance captured in correspondence with the lyrics and backing track, but pitch-corrected in accord with the pitch correction settings.

In some cases, the pitch correction settings code settings characteristic of a particular artist or a particular vocal performance corresponding to the backing track. In some cases, the pitch correction settings code a musical key or scale. In some cases, the pitch correction settings code temporal variations that are performance synchronized with timings of particular lyrics to provide note targets. In some cases, the backing track encodes either or both of instrumentals and backing vocals.

In some embodiments, the method further includes responsive to the user selection, retrieving the pitch correction settings via the communications interface. In some embodiments, the method further includes receiving from the remote server, and audibly rendering at the portable computing device, a second mixed performance, wherein the second mixed performance is an encoding of the user's own pitch-corrected vocal performance mixed with the second encoding of the backing track. In some embodiments, the method further includes audibly rendering the second mixed performance on a remote device.

In some cases, the portable computing device is a mobile phone. In some cases, the portable computing device is a personal digital assistant. In some cases, the portable computing device is a laptop computer, notebook computer pad-type device or netbook.

In some embodiments, the method further includes audibly rendering a third mixed performance at the portable computing device, wherein the third mixed performance is an encoding of another pitch-corrected vocal performance captured and pitch-corrected at a second remote device and mixed with the backing track.

In some embodiments, the method further includes geocoding the transmitted audio encoding of the pitch-corrected vocal performance; and displaying a geographic origin for, and in correspondence with audible rendering of, a third mixed performance of a pitch-corrected vocal performance captured and pitch-corrected at a third remote device and mixed with the backing track, the third mixed performance received via the data communications interface directly or indirectly from a third remote device. In some cases, the display of geographic origin is by display animation suggestive of a performance emanating from a particular location on a globe. In some embodiments, the method further includes capturing and conveying back to the remote server one or more of (i) listener comment on and (ii) ranking of the third mixed performance for inclusion as metadata in association with subsequent supply and rendering thereof.

In some embodiments in accordance with the present invention, a portable computing device includes a display; a microphone interface; an audio transducer interface; a data communications interface; user interface code, pitch correction code and transmit code. The user interface code is executable on the portable computing device to capture user interface gestures selective for a backing track and to initiate retrieval of at least lyrics and timing information corresponding thereto. The user interface code is further executable to capture user interface gestures to initiate (i) audible rendering a first encoding of the backing track, (ii) concurrent presentation the lyrics on the display and (iii) capture of the user's vocal performance using the microphone interface. The pitch correction code is executable on the portable computing device to, concurrent with said audible rendering, continuously pitch correct the user's vocal performance in accord with pitch correction settings. The transmit code is executable on the portable computing device to transmit to a remote server via the data communications interface, an audio encoding of the pitch-corrected vocal performance for mixing with a second encoding of the backing track. In some cases, the second encoding is of higher quality or fidelity than the first encoding.

In some embodiments, the portable computing device further includes a rendering pipeline that mixes the user's pitch-corrected vocal performance into the audible rendering of the backing track at the portable computing device, such that the resulting mixed performance includes the user's own vocal performance captured in correspondence with the lyrics and backing track, but pitch-corrected in accord with the pitch correction settings.

In some embodiments, the portable computing device further includes local storage. The initiated retrieval includes checking instances, if any, of the lyrics and timing information in the local storage against instances available from a remote server and retrieving from the remote server if instances in local storage are unavailable or out-of-date.

In some cases, the user interface code is further executable to initiate retrieval of the first encoding of the backing track. In some cases, the user interface code is further executable to initiate retrieval of the pitch correction settings, and the pitch correction settings code one or more of:

settings characteristic of a particular artist or a particular vocal performance corresponding to the backing track; a musical key or scale; and temporal variations that are performance synchronized with timings of particular lyrics to provide note targets. In some cases, the user interface code is further executable to allow the user to dynamically alter the pitch correction settings during the course of the vocal performance.

In some embodiments in accordance with the present invention, a computer program product is encoded in one or more media and includes instructions executable on a processor of the portable computing device to cause the portable computing device to: retrieve via the data communications interface both lyrics and timing information corresponding to a backing track; audibly render a first encoding of the backing track and concurrently present the lyrics on the display in accord with the timing information; capture and continuously pitch correct a vocal performance of a user in accord with pitch correction settings; and transmit to a remote server via the data communications interface, an audio encoding of the pitch-corrected vocal performance for mixing with a second encoding of the backing track. In some cases, the second encoding is of higher quality or fidelity than the first encoding.

In some embodiments, the instructions are executable on the processor of the portable computing device to further cause the portable computing device to mix the pitch-corrected vocal performance into the audible rendering of the backing track at the portable computing device, wherein the resulting mixed performance includes the user's own vocal performance captured in correspondence with the lyrics and backing track, but pitch-corrected in accord with the pitch correction settings.

In some embodiments in accordance with the present invention, a method includes supplying (from a content server and responsive to a user selection) a first portable computing device with (i) a first encoding of a backing track and (ii) associated lyrics and timing information. At the content server, an encoding of a captured and pitch-corrected vocal performance of the user is received, wherein the pitch-corrected vocal performance corresponds to the backing track, lyrics and timing information. At the content server, the received pitch-corrected vocal performance is mixed with a second encoding of the backing track and thereafter the resulting mixed performance is supplied for audible rendering at a first remote device.

In some embodiments, the method further includes supplying the mixed performance for audible rendering at the portable computing device. In some cases, the second encoding is of higher quality or fidelity than the first encoding. In some embodiments, the method further includes mixing the received pitch-corrected vocal performance with a third encoding of the backing track as an alternative mixed performance, the third encoding being of still higher quality or fidelity than the second; and supplying the alternative mixed performance for audible rendering at a second remote device. In some embodiments, the method further includes selecting one of the resulting mixed performance and the alternative mixed performance for supply to a third remote device based on characteristics of the third remote device or of a communications channel thereto. In some embodiments, the method further includes receiving at the content server one or more of (i) a geocode for the pitch-corrected vocal performance and (ii) listener comment on or ranking of the resulting mixed performance for inclusion as metadata in association with subsequent supply and rendering thereof.

These and other embodiments in accordance with the present invention(s) will be understood with reference to the description and appended claims which follow.

BRIEF DESCRIPTION OF THE DRAWINGS

The present invention is illustrated by way of example and not limitation with reference to the accompanying figures, in which like references generally indicate similar elements or features.

Figure 1:
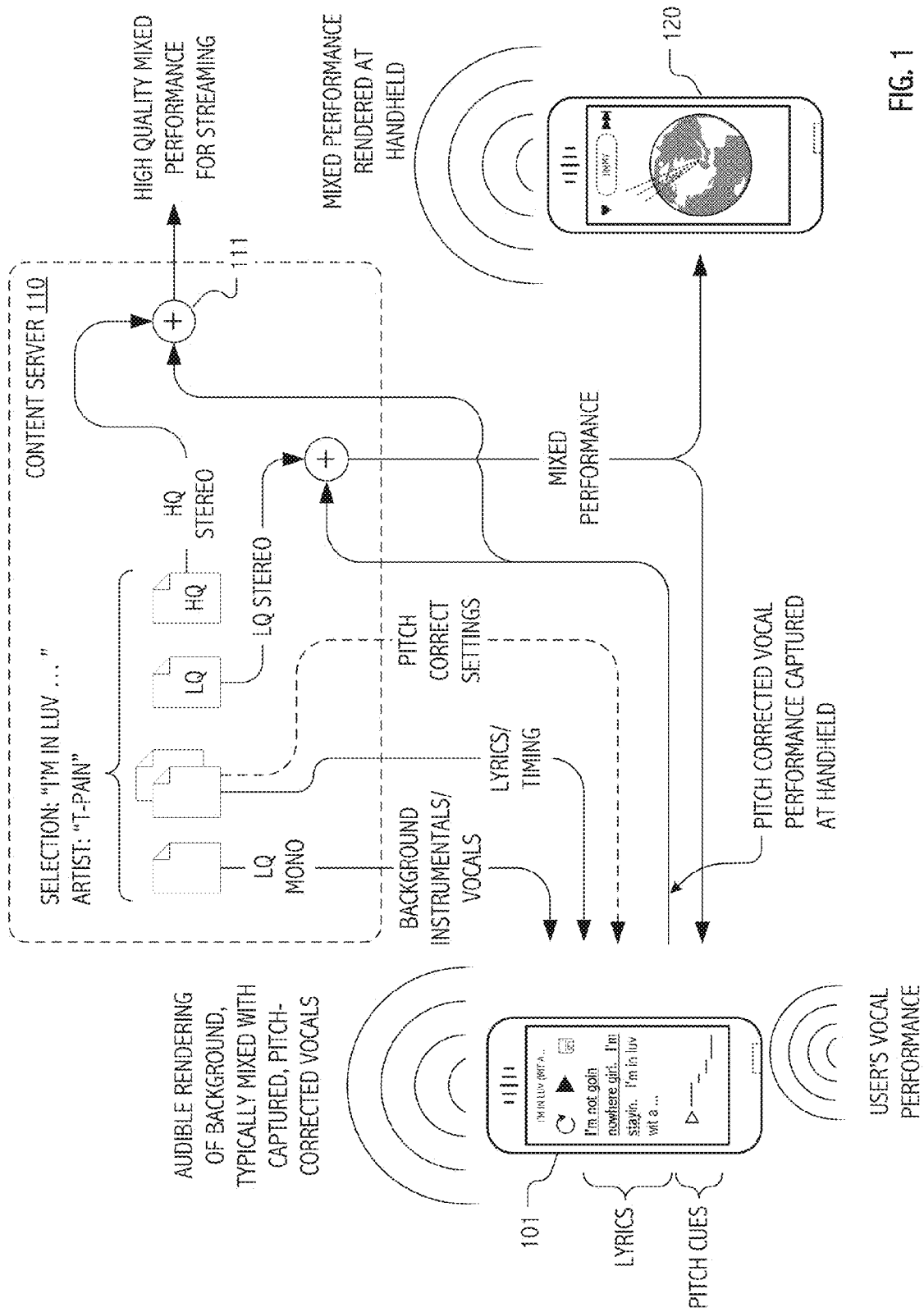
FIG. 1 depicts information flows amongst illustrative mobile phone-type portable computing devices and a content server in accordance with some embodiments of the present invention.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION

Techniques have been developed to facilitate (1) the capture and pitch correction of vocal performances on handheld or other portable computing devices and (2) the mixing of such pitch-corrected vocal performances with backing tracks for audible rendering on targets that include such portable computing devices and as well as desktops, workstations, gaming stations and even telephony targets. Implementations of the described techniques employ signal processing techniques and allocations of system functionality that are suitable given the generally limited capabilities of such handheld or portable computing devices and that facilitate efficient encoding and communication of the pitch-corrected vocal performances (or precursors or derivatives thereof) via wireless and/or wired bandwidth-limited networks for rendering on portable computing devices or other targets.

In some cases, the developed techniques build upon vocal performance capture with continuous, real-time pitch detection and correction and upon encoding/transmission of such pitch-corrected vocals to a content server where, in some embodiments, they may be mixed with backing tracks (e.g., instrumentals, vocals, etc.) and encoded for delivery to a device at which they will be audibly rendered. In some cases, mixing of pitch-corrected vocals with backing tracks may be performed at the rendering target itself. Typically, first and second encodings are respective versions (often of differing quality or fidelity) of the same underlying audio source material, although in some cases or situations, different source material with equivalent timing may be employed.

Use of first and second encodings of such a backing track (e.g., one at the handheld or other portable computing device at which vocals are captured, and one at the content server) allows the respective encodings to be adapted to data transfer bandwidth constraints or to needs at the particular device/platform at which they are employed. For example, in some embodiments, a first encoding of the backing track audibly rendered at a handheld or other portable computing device as an audio backdrop to vocal capture may be of lesser quality or fidelity than a second encoding of that same backing track used at the content server to prepare the mixed performance for audible rendering. In this way, high quality mixed audio content may be provided while limiting data bandwidth requirements to a handheld device used for capture and pitch correction of a vocal performance. Notwithstanding the foregoing, backing track encodings employed at the portable computing device may, in some cases, be of equivalent or even better quality/fidelity those at the content server. For example, in embodiments or situations in which a suitable encoding of the backing track already exists at the mobile phone (or other portable computing device), such as from a music library resident thereon or based on prior download from the content server, download data bandwidth requirements may be quite low. Lyrics, timing information and applicable pitch correction settings may be retrieved for association with the existing backing track using any of a variety of identifiers ascertainable, e.g., from audio metadata, track title, an associated thumbnail or even fingerprinting techniques applied to the audio, if desired.

Pitch detection and correction of a user's vocal performance are performed continuously and in real-time with respect to the audible rendering of the backing track at the mobile phone (or other portable computing device). In this way, the pitch-corrected vocal performance may be mixed with the audible rendering to overlay instrumentals and/or vocals of the backing track. In some multi-technique implementations, pitch detection builds on time-domain pitch correction techniques that employ average magnitude difference function (AMDF) or autocorrelation-based techniques together with zero-crossing and/or peak picking techniques to identify differences between pitch of a captured vocal signal and score-coded target pitches. Based on detected differences, pitch correction based on pitch synchronous overlapped add (PSOLA) and/or linear predictive coding (LPC) techniques allow captured vocals to be pitch-corrected in real-time to "correct" notes in accord with pitch correction settings that include score-coded note targets. Alternatively, or in addition, pitch correction settings may select a particular scale or key for the vocal performance or particular portions thereof. Alternatively, or in addition, pitch correction settings may be selected to distort the captured vocal performance in accord with a desired effect, such as with pitch correction effects popularized by a particular musical performance or particular artist. In some embodiments, pitch correction may be based on techniques that computationally simplify autocorrelation calculations as applied to a variable window of samples from a captured vocal signal, such as with plug-in implementations of Auto-Tune® technology popularized by, and available from, Antares Audio Technologies. Frequency domain techniques, such as FFT peak picking for pitch detection and phase vocoding for pitch shifting, may be used in some implementations.

In general, "correct" notes are those notes that are consistent with a specified key or scale or which, in some embodiments, correspond to a score-coded melody (or harmony) expected in accord with a particular point in the performance. That said, in a capella modes without an operant score (or that allow a user to, during vocal capture, dynamically vary pitch correction settings of an existing score) may be provided in some implementations to facilitate ad-libbing. For example, user interface gestures captured at the mobile phone (or other portable computing device) may, for particular lyrics, allow the user to (i) switch off (and on) use of score-coded note targets, (ii) dynamically switch back and forth between melody and harmony note sets as operant pitch correction settings and/or (iii) selectively fall back (at gesture selected points in the vocal capture) to settings that cause sounded pitches to be corrected solely to nearest notes of a particular key or scale (e.g., C major, C minor, E flat major, etc.) In short, user interface gesture capture and dynamically variable pitch correction settings can provide a Freestyle mode for advanced users.

Based on the compelling and transformative nature of the pitch-corrected vocals, user/vocalists typically overcome an otherwise natural shyness or angst associated with sharing their vocal performances. Instead, even mere amateurs are encouraged to share with friends and family or to collaborate and contribute vocal performances as part of an affinity group. In some implementations, these interactions are facilitated through social network- and/or eMail-mediated sharing of performances and invitations to join in a group performance. Using uploaded vocals captured at clients such as the aforementioned portable computing devices, a content server (or service) can mediate such affinity groups by manipulating and mixing the uploaded vocal performances of multiple contributing vocalists. Depending on the goals and implementation of a particular system, uploads may include pitch-corrected vocal performances, dry (i.e., uncorrected) vocals, and/or control tracks of user key and/or pitch correction selections, etc.

Karaoke-Style Vocal Performance Capture

Although embodiments of the present invention are not limited thereto, mobile phone-hosted, pitch-corrected, karaoke-style, vocal capture provides a useful descriptive context. For example, in some embodiments such as illustrated in FIG. 1, an iPhone™ handheld available from Apple Inc. (or more generally, handheld 101) hosts software that executes in coordination with a content server to provide vocal capture and continuous real-time, score-coded pitch correction of the captured vocals. As is typical of karaoke-style applications (such as the "I am T-Pain" application for iPhone available from SonicMule, Inc.), a backing track of instrumentals and/or vocals can be audibly rendered for a user/vocalist to sing against. In such cases, lyrics may be displayed in correspondence with the audible rendering so as to facilitate a karaoke-style vocal performance by a user. In some cases or situations, backing audio may be rendered from a local store such as from content of an iTunes™ library resident on the handheld.

User vocals are captured at the handheld, pitch-corrected continuously and in real-time (again at the handheld) and audibly rendered (mixed with the backing track) to provide the user with an improved tonal quality rendition of his/her own vocal performance. Pitch correction is typically based on score-coded melody or harmony note sets or cues, which provide continuous pitch-correction with performance synchronized sequences of target notes in a current key or scale. In some cases, pitch correction settings may be characteristic of a particular artist such as the artist that performed vocals associated with the particular backing track.

In the illustrated embodiment, backing audio (here, one or more instrumental/vocal tracks), lyrics and timing information and pitch/harmony cues are all supplied (or demand updated) from one or more content servers or hosted service platforms (here, content server 110). For a given song and performance, such as "I'm in Luv (wit a . . . )", several versions of the background track may be stored, e.g., on the content server. For example, in some implementations or deployments, versions may include:

uncompressed stereo wav format backing track,
uncompressed mono wav format backing track and
compressed mono m4a format backing track.

In addition, lyrics, melody and harmony track note sets and related timing and control information may be encapsulated as a score coded in an appropriate container or object (e.g., in a Musical Instrument Digital Interface, MIDI, or Java Script Object Notation, json, type format) for supply together with the backing track(s). Using such information, handheld 101 may display lyrics and even visual cues related to target notes, harmonies and currently detected vocal pitch in correspondence with an audible performance of the backing track(s) so as to facilitate a karaoke-style vocal performance by a user.

Thus, if an aspiring vocalist selects on the handheld device "I'm in Luv (wit a . . . )" as originally popularized by the artist T-Pain, iminluv.json and iminluv.m4a may be downloaded from the content server (if not already available or cached based on prior download) and, in turn, used to provide background music, synchronized lyrics and, in some situations or embodiments, score-coded note tracks for continuous, real-time pitch-correction shifts while the user sings. Optionally, at least for certain embodiments or genres, harmony note tracks may be score coded for harmony shifts to captured vocals. Typically, a captured pitch-corrected (or possibly harmonized) vocal performance is saved locally on the handheld device as one or more way files and is subsequently compressed (e.g., using lossless Apple Lossless Encoder, ALE, or lossy Advanced Audio Coding, AAC, or vorbis codec) and encoded for upload to the content server as an MPEG-4 audio, m4a, or ogg container file. MPEG-4 is an international standard for the coded representation and transmission of digital multimedia content for the Internet, mobile networks and advanced broadcast applications. OGG is an open standard container format often used in association with the vorbis audio format specification and codec for lossy audio compression. Other suitable codecs, compression techniques, coding formats and/or containers may be employed if desired.

Depending on the implementation, encodings of dry vocal and/or pitch-corrected vocals may be uploaded to the content server. In general, such vocals (encoded, e.g., as way, m4a, ogg/vorbis content or otherwise) whether already pitch-corrected or pitch-corrected at the content server can then be mixed (e.g., with backing audio) to produce files or streams of quality or coding characteristics selected accord with capabilities or limitations a particular target or network. For example, pitch-corrected vocals can be mixed with both the stereo and mono way files to produce streams of differing quality. For example, a high quality stereo version can be produced for web playback and a lower quality mono version for streaming to devices such as the handheld device itself.

Pitch Correction, Generally

In some cases, it may be desirable to pitch correct the captured vocal performance using a vocoder or similar technique at the handheld device. For example, in some embodiments, an Antares Auto-Tune® implementation is provided at the handheld device and may be activated anytime vocal capture is operating with a hot microphone. In such case, the vocal capture application takes the audio input from the microphone and runs it (in real time) through the Auto-Tune® library, saving the resulting pitch-corrected vocal performance to local storage (for upload to the content server). Typically, the handheld application locally mixes the pitch-corrected vocal performance with the background instrumentals and/or background vocals (more generally, a backing track) for real time audible rendering.

In general, the previously described json format file includes lyrics and timing information as well as pitch correction settings such as the pitches to which a vocal performance should be tuned and/or the level of pitch correction desired. Pitch correction settings may be specified on a global basis for an entire song (for example, pitch correct to C major scale), or can be synchronized and used in conjunction with individual lyrics timings so that the precise pitch of particular notes/syllables can be specified. In some embodiments, pitch correction can detect whether (and how much) a given vocal performance is on/off key and apply different levels of assistance as needed to improve the performance. In some embodiments, pitch correction can be used to provide vocal effects in accord with a particular or popular performance of the selected track or in accord with characteristic effects employed by a particular artist.

Figure 2:
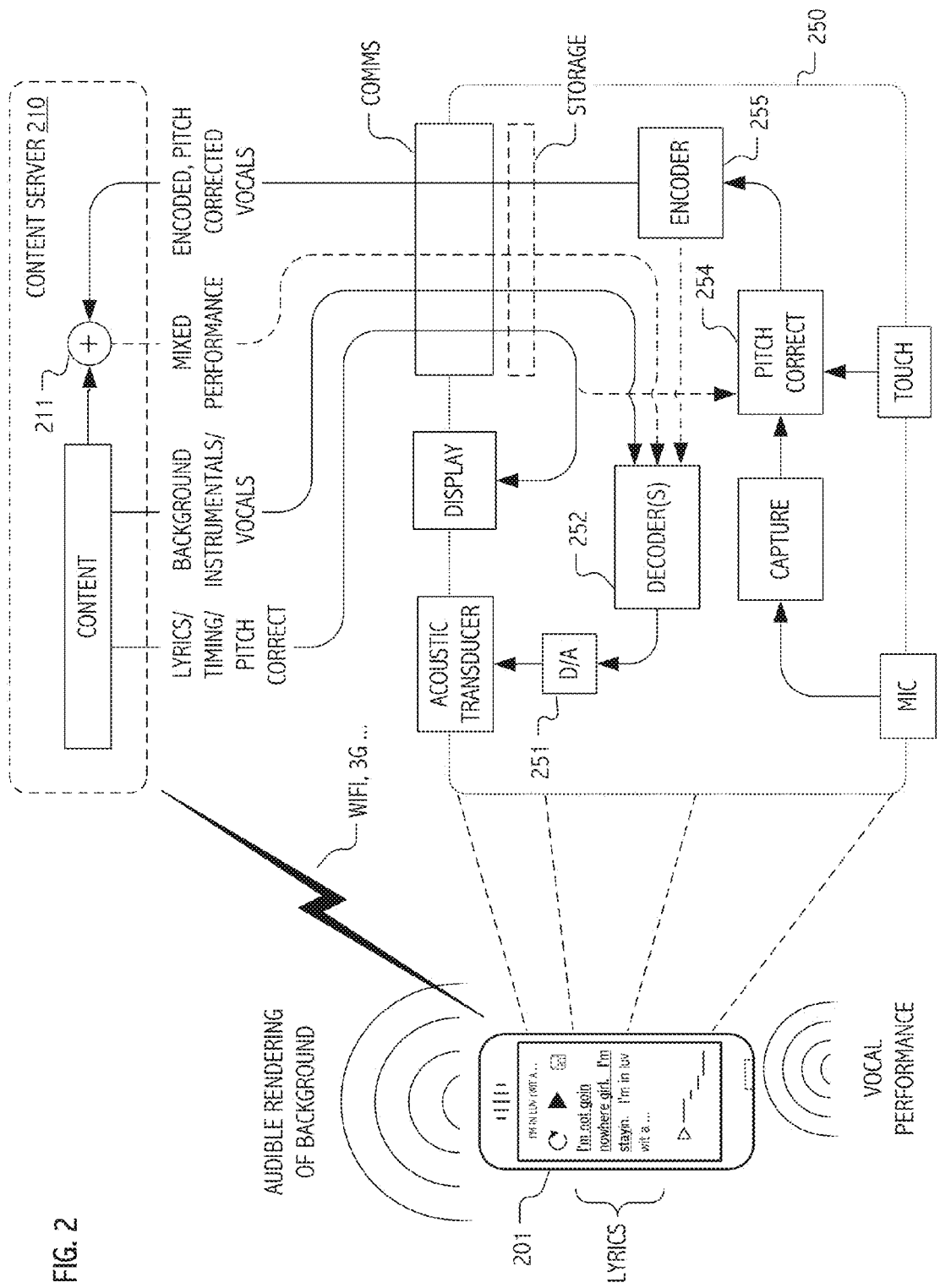
FIG. 2 is a functional block diagram of hardware and software components executable at an illustrative mobile phone-type portable computing device in accordance with some embodiments of the present invention.
Figure 3:
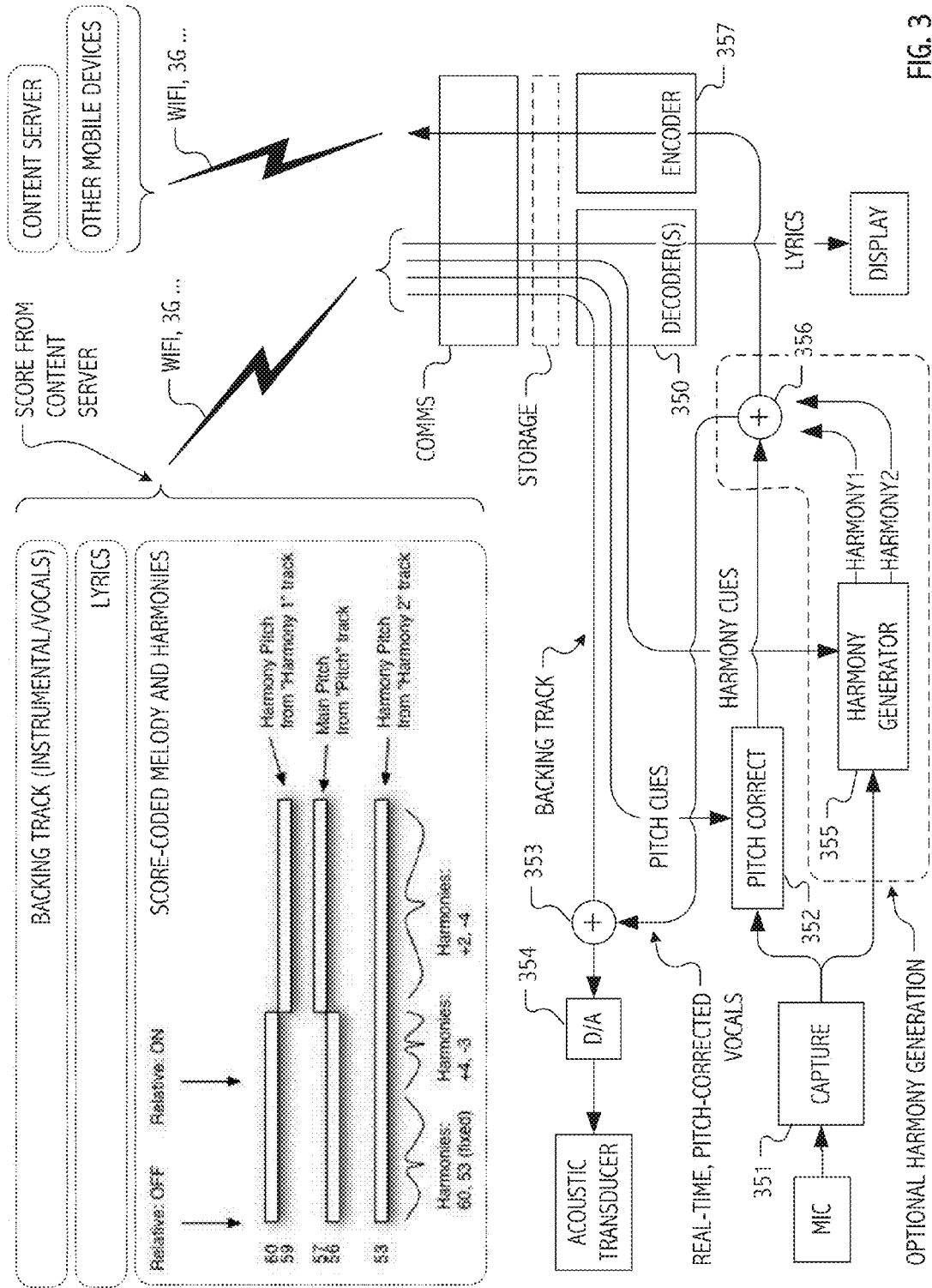
FIG. 3 illustrates a flow diagram illustrating, for a captured vocal performance, real-time continuous pitch-correction based on score-coded pitch correction settings in accordance with some embodiments of the present invention.

As will be appreciated by persons of ordinary skill in the art having benefit of the present description, pitch-detection and correction techniques may be employed both for correction of a captured vocal signal to a target pitch or note as well as for generation of harmonies as pitch-shifted variants of the captured vocal signal. FIGS. 2 and 3 illustrate basic signal processing flows (250, 350) in accord with certain illustrative implementations suitable for an iPhone™ handheld, e.g., that illustrated as mobile device 201, to generate the pitch-corrected (and, in the case of FIG. 3, optionally harmonized vocals) supplied for audible rendering by (or at) one or more target devices.

As will also be appreciated by persons of ordinary skill in the art, pitch-detection and pitch-correction have a rich technological history in the music and voice coding arts. Indeed, a wide variety of feature picking, time-domain and even frequency domain techniques have been employed in the art and may be employed in some embodiments in accord with the present invention. The present description does not seek to exhaustively inventory the wide variety of signal processing techniques that may be suitable in various design or implementations in accord with the present description; rather, we summarize certain techniques that have proved workable in implementations (such as mobile device applications) that contend with CPU-limited computational platforms. Based on the description herein, persons of ordinary skill in the art will appreciate suitable allocations of signal processing techniques (sampling, filtering, decimation, etc.) and data representations to functional blocks (e.g., decoder(s) 252, digital-to-analog (D/A) converter 251, capture 253, pitch correction 254 and encoder 255) of signal processing flows 250 illustrated in FIG. 2. Likewise, relative to the signal processing flows 350 and illustrative score coded note targets (including harmony note targets), persons of ordinary skill in the art will appreciate suitable allocations of signal processing techniques and data representations to functional blocks and signal processing constructs (e.g., decoder 350, capture 351, pitch correction 352, mixers 353, 356, and encoder 357) illustrated in FIG. 3.

Accordingly, in view of the above and without limitation, certain exemplary embodiments operate as follows:
1) Get a buffer of audio data containing the sampled user vocals.
2) Downsample from a 44.1 kHz sample rate by low-pass filtering and decimation to 22 k (for use in pitch detection and correction of sampled vocals as a main voice, typically to score-coded melody note target) and to 11 k (for pitch detection and shifting of harmony variants of the sampled vocals).
3) Call a pitch detector (PitchDetector::CalculatePitch ( )), which first checks to see if the sampled audio signal is of sufficient amplitude and if that sampled audio isn't too noisy (excessive zero crossings) to proceed. If the sampled audio is acceptable, the CalculatePitch ( ) method calculates an average magnitude difference function (AMDF) and executes logic to pick a peak that corresponds to an estimate of the pitch period. Additional processing refines that estimate. For example, in some embodiments parabolic interpolation of the peak and adjacent samples may be employed. In some embodiments and given adequate computational bandwidth, an additional AMDF may be run at a higher sample rate around the peak sample to get better frequency resolution.
4) Shift the main voice to a score-coded target pitch by using a pitch-synchronous overlap add (PSOLA) technique at a 22 kHz sample rate (for higher quality and overlap accuracy). The PSOLA implementation (Smola::PitchShiftVoice ( )) is called with data structures and Class variables that contain information (detected pitch, pitch target, etc.) needed to specify the desired correction. In general, target pitch is selected based on score-coded targets (which change frequently in correspondence with a melody note track) and in accord with current scale/mode settings. Scale/mode settings may be updated in the course of a particular vocal performance, but usually not too often based on score-coded information, or in an a capella or Freestyle mode based on user selections.

PSOLA techniques facilitate resampling of a waveform to produce a pitch-shifted variant while reducing aperiodic affects of a splice and are well known in the art. PSOLA techniques build on the observation that it is possible to splice two periodic waveforms at similar points in their periodic oscillation (for example, at positive going zero crossings, ideally with roughly the same slope) with a much smoother result if you cross fade between them during a segment of overlap. For example, if we had a quasi periodic sequence like:

| a | b | c | d | e | d | c | b | a | b | c | d.1 | e.2 | d.2 | c.1 | b.1 | a | b.1 | c.2 |
|---|---|---|---|---|---|---|---|---|---|---|-----|-----|-----|-----|-----|---|-----|-----|
| 0 | 1 | 2 | 3 | 4 | 5 | 6 | 7 | 8 | 9 | 10 | 11 | 12 | 13 | 14 | 15 | 16 | 17 | 18 | with samples {a, b, c, . . . } and indices 0, 1, 2, . . . (wherein the .1 symbology represents deviations from periodicity) and wanted to jump back or forward somewhere, we might pick the positive going c-d transitions at indices 2 and 10, and instead of just jumping, ramp:

$(1*c+0*c), (d*7/8+(d.1)/8), (e*6/8+(e.2)*2/8) \ldots$ until we reached $(0*c+1*c.1)$ at index 10/18, having jumped forward a period (8 indices) but made the aperiodicity less evident at the edit point. It is pitch synchronous because we do it at 8 samples, the closest period to what we can detect. Note that the cross-fade is a linear/triangular overlap-add, but (more generally) may employ complimentary cosine, 1-cosine, or other functions as desired.

5) Generate the harmony voices using a method that employs both PSOLA and linear predictive coding (LPC) techniques. The harmony notes are selected based on the current settings, which change often according to the score-coded harmony targets, or which in Freestyle can be changed by the user. These are target pitches as described above; however, given the generally larger pitch shift for harmonies, a different technique may be employed. The main voice (now at 22 k, or optionally 44 k) is pitch-corrected to target using PSOLA techniques such as described above. Pitch shifts to respective harmonies are likewise performed using PSOLA techniques. Then a linear predictive coding (LPC) is applied to each to generate a residue signal for each harmony. LPC is applied to the main un-pitch-corrected voice at 11 k (or optionally 22 k) in order to derive a spectral template to apply to the pitch-shifted residues. This tends to avoid the head-size modulation problem (chipmunk or munchkinification for upward shifts, or making people sound like Darth Vader for downward shifts).
6) Finally, the residues are mixed together and used to re-synthesize the respective pitch-shifted harmonies using the filter defined by LPC coefficients derived for the main un-pitch-corrected voice signal. The resulting mix of pitch-shifted harmonies are then mixed with the pitch-corrected main voice.
7) Resulting mix is upsampled back up to 44.1 k, mixed with the backing track (except in Freestyle mode) or an improved fidelity variant thereof buffered for handoff to audio subsystem for playback.

Function names, sampling rates and particular signal processing techniques applied are, of course, all matters of design choice and subject to adaptation for particular applications, implementations, deployments and audio sources.

Content Server for Mix with High Quality Backing Tracks

Referring again to FIG. 1, once a user performance is captured at the handheld device, the captured vocal performance audio (typically pitch-corrected) is compressed using an audio codec (e.g., a vorbis codec) and included as an audio layer in an appropriate container object (e.g., in a file object in accord with the ogg container format) and uploaded to the content server 110, 210. The content server then mixes (111, 211) the captured, pitch-corrected vocal performance encoding with the full instrumental (and/or background vocal) backing track (HQ version) to create high fidelity master audio. This master (not separately shown) may, in turn, be encoded using any techniques suitable for the target device(s) and/or the expected network transports. For example, in some embodiments, an AAC codec is used at various bit rates to produce compressed audio layers of M4A container files which are suitable for streaming back audio to the capturing handheld device (or to other remote devices) and for streaming/playback via the web.

Typically, the first and second encodings of backing tracks described herein are respective versions (often of differing quality or fidelity) of the same underlying audio source material. For example, in the illustration of FIG. 1, a first encoding (LQ MONO) of the backing track is of lesser quality/fidelity than a second encoding (HQ STEREO) thereof, but both are encodings, or derivative encodings, of the same performance by T-Pain of the song "I'm in Luv (wit a . . . " In some cases or situations, different source material with equivalent timing could be employed.

In general, use of first and second encodings of such a backing track (e.g., one at the handheld or other portable computing device at which vocals are captured, and one at the content server) allows the respective encodings to be adapted to data transfer bandwidth constraints or to needs at the particular device/platform at which they are employed. For example, in some embodiments, a first encoding of the backing track audibly rendered at a handheld or other portable computing device as an audio backdrop to vocal capture may be of lesser quality or fidelity than a second encoding of that same backing track used at the content server to prepare the mixed performance for audible rendering. In this way, high quality mixed audio content may be provided while limiting data bandwidth requirements to a handheld device such as a mobile phone used for capture and pitch correction of a vocal performance. Notwithstanding the foregoing, backing track encodings employed at the portable computing device may, in some cases, be of equivalent or even higher quality/fidelity than those at the content server. For example, in embodiments or situations in which a suitable encoding of the backing track already exists at the mobile phone (or other portable computing device), such as from a music library resident thereon or based on prior download from the content server, download data bandwidth requirements may be quite low. Lyrics, timing information and applicable pitch correction settings may be retrieved for association with the existing backing track using any of a variety of identifiers ascertainable, e.g., from audio metadata, track title, an associated thumbnail or even fingerprinting techniques applied to the audio, if desired.

In general, relative to capabilities of commonly deployed wireless networks, it can be desirable from an audio data bandwidth perspective to limit the uploaded data to that necessary to represent the vocal performance. In some cases, data streamed for playback may separate vocal tracks as well. In general, vocal and/or backing track audio exchange between the handheld device and content server may be adapted to the quality and capabilities of an available data connection.

Although the illustration of FIG. 1 includes, for at least some targets at which the pitch-corrected vocal performance will be audibly rendered, mixing (at content server 110) with a high quality backing track (HQ), in some cases or for some targets, mixing of pitch-corrected vocals with a suitable backing track may be performed elsewhere, e.g., at the mixed performance rendering target itself. For example, just as locally-resident iTunes™ content may, in some embodiments or situations, be used at the vocal capture device as a first encoding of the backing track for audible rendering during capture, iTunes™ content at the eventual rendering target device may be mixed (at the rendering device) with a received pitch-corrected to produce the resulting mixed performance. It will be appreciated that, in embodiments or situations that allow respective locally-resident content to be used, at the vocal capture device, as a first encoding of the backing track and, at the rendering target, as a second encoding of the backing track, data transfer bandwidth requirements are advantageously reduced as audio data transfers need only encode the pitch-corrected vocal performance. Reductions in content licensing costs may also accrue in some situations.

As will be appreciated by persons of ordinary skill in the art based on the present description, the term "content server" is intended to have broad scope, encompassing not only a single physical server that hosts audio content and functionality described and illustrated herein, but also collections of server or service platforms that together host the audio content and functionality described. For example, in some embodiments, content server 110, 210 is implemented (at least in part) using hosted storage services such as popularized by platforms such as the Amazon Simple Storage Service (S3) platform. Functionality, such as mixing of backing audio with captured, pitch-corrected vocals, selection of appropriate source or target audio coding forms or containers and introduction of appropriately coded or transcoded audio into networks, etc. may itself by hosted on servers or service/compute platforms.

World Stage

Although much of the description herein has focused on vocal performance capture, pitch correction and use of respective first and second encodings of a backing track relative to capture and mix of a user's own vocal performances, it will be understood that facilities for audible rendering of remotely captured performances of others may be provided in some situations or embodiments. In such situations or embodiments, vocal performance capture occurs at another device and after a corresponding encoding of the captured (and typically pitch-corrected) vocal performance is received at a present device, it is audibly rendered in association with a visual display animation suggestive of the vocal performance emanating from a particular location on a globe. FIG. 1 illustrates a snapshot of such a visual display animation at handheld 120, which for purposes of the present illustration, will be understood as another instance of a programmed mobile phone (or other portable computing device) such as described and illustrated with reference to handheld device instances 101 and 201, except that (as depicted with the snapshot) handheld 120 is operating in a play (or listener) mode, rather than the capture and pitch-correction mode described at length hereinabove.

When a user executes the handheld application and accesses this play (or listener) mode, a world stage is presented. More specifically, a network connection is made to content server 110 reporting the handheld's current network connectivity status and playback preference (e.g., random global, top loved, my performances, etc). Based on these parameters, content server 110 selects a performance (e.g., a pitch-corrected vocal performance such as may have been captured at handheld device instance 101 or 201 and transmits metadata associated therewith. In some implementations, the metadata includes a uniform resource locator (URL) that allows handheld 120 to retrieve the actual audio stream (high quality or low quality depending on the size of the pipe), as well as additional information such as geocoded (using GPS) location of the performance capture and attributes of other listeners who have loved, tagged or left comments for the particular performance. In some embodiments, listener feedback is itself geocoded. During playback, the user may tag the performance and leave his own feedback or comments for a subsequent listener and/or for the original vocal performer. Once a performance is tagged, a relationship may be established between the performer and the listener. In some cases, the listener may be allowed to filter for additional performances by the same performer and the server is also able to more intelligently provide "random" new performances for the user to listen to based on an evaluation of user preferences.

Although not specifically illustrated in the snapshot, it will be appreciated that geocoded listener feedback indications are, or may optionally be, presented on the globe (e.g., as stars or "thumbs up" or the like) at positions to suggest, consistent with the geocoded metadata, respective geographic locations from which the corresponding listener feedback was transmitted. It will be further appreciated that, in some embodiments, the visual display animation is interactive and subject to viewpoint manipulation in correspondence with user interface gestures captured at a touch screen display of handheld 120. For example, in some embodiments, travel of a finger or stylus across a displayed image of the globe in the visual display animation causes the globe to rotate around an axis generally orthogonal to the direction of finger or stylus travel. Both the visual display animation suggestive of the vocal performance emanating from a particular location on a globe and the listener feedback indications are presented in such an interactive, rotating globe user interface presentation at positions consistent with their respective geotags.

An Exemplary Mobile Device

Figure 4:
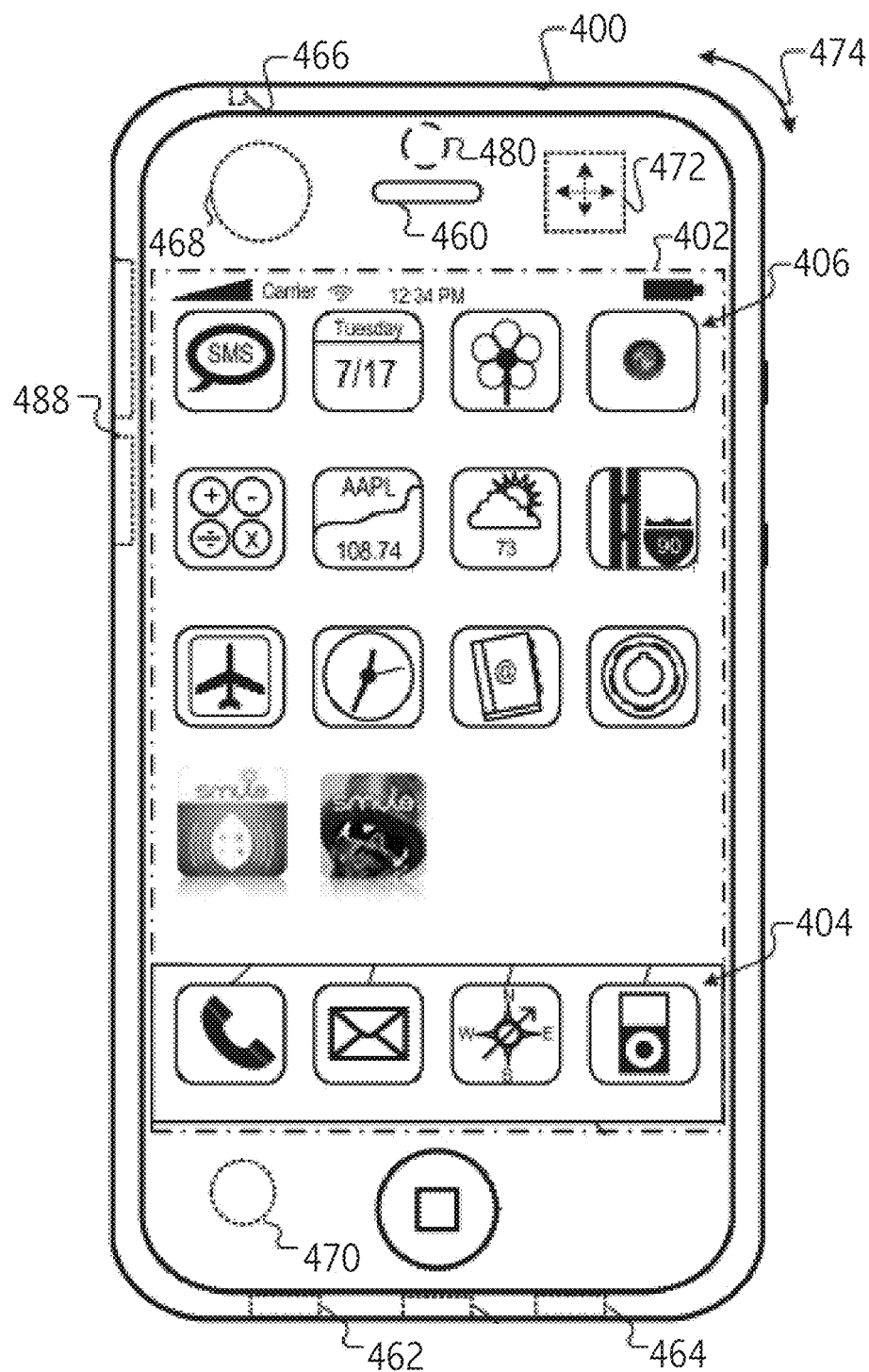
FIG. 4 illustrates features of a mobile device that may serve as a platform for execution of software implementations in accordance with some embodiments of the present invention.

FIG. 4 illustrates features of a mobile device that may serve as a platform for execution of software implementations in accordance with some embodiments of the present invention. More specifically, FIG. 4 is a block diagram of a mobile device 400 that is generally consistent with commercially-available versions of an iPhone™ mobile digital device. Although embodiments of the present invention are certainly not limited to iPhone deployments or applications (or even to iPhone-type devices), the iPhone device, together with its rich complement of sensors, multimedia facilities, application programmer interfaces and wireless application delivery model, provides a highly capable platform on which to deploy certain implementations.

Summarizing briefly, mobile device 400 includes a display 402 that can be sensitive to haptic and/or tactile contact with a user. Touch-sensitive display 402 can support multi-touch features, processing multiple simultaneous touch points, including processing data related to the pressure, degree and/or position of each touch point. Such processing facilitates gestures and interactions with multiple fingers, chording, and other interactions. Of course, other touch-sensitive display technologies can also be used, e.g., a display in which contact is made using a stylus or other pointing device.

Typically, mobile device 400 presents a graphical user interface on the touch-sensitive display 402, providing the user access to various system objects and for conveying information. In some implementations, the graphical user interface can include one or more display objects 404, 406. In the example shown, the display objects 404, 406, are graphic representations of system objects. Examples of system objects include device functions, applications, windows, files, alerts, events, or other identifiable system objects. In some embodiments of the present invention, applications, when executed, provide at least some of the digital acoustic functionality described herein.

Typically, the mobile device 400 supports network connectivity including, for example, both mobile radio and wireless internetworking functionality to enable the user to travel with the mobile device 400 and its associated network-enabled functions. In some cases, the mobile device 400 can interact with other devices in the vicinity (e.g., via Wi-Fi, Bluetooth, etc.). For example, mobile device 400 can be configured to interact with peers or a base station for one or more devices. As such, mobile device 400 may grant or deny network access to other wireless devices.

Mobile device 400 includes a variety of input/output (I/O) devices, sensors and transducers. For example, a speaker 460 and a microphone 462 are typically included to facilitate audio, such as the capture of vocal performances and audible rendering of backing tracks and mixed pitch-corrected vocal performances as described elsewhere herein. In some embodiments of the present invention, speaker 460 and microphone 662 may provide appropriate transducers for techniques described herein. An external speaker port 464 can be included to facilitate hands-free voice functionalities, such as speaker phone functions. An audio jack 466 can also be included for use of headphones and/or a microphone. In some embodiments, an external speaker and/or microphone may be used as a transducer for the techniques described herein.

Other sensors can also be used or provided. A proximity sensor 468 can be included to facilitate the detection of user positioning of mobile device 400. In some implementations, an ambient light sensor 470 can be utilized to facilitate adjusting brightness of the touch-sensitive display 402. An accelerometer 472 can be utilized to detect movement of mobile device 400, as indicated by the directional arrow 474. Accordingly, display objects and/or media can be presented according to a detected orientation, e.g., portrait or landscape. In some implementations, mobile device 400 may include circuitry and sensors for supporting a location determining capability, such as that provided by the global positioning system (GPS) or other positioning systems (e.g., systems using Wi-Fi access points, television signals, cellular grids, Uniform Resource Locators (URLs)) to facilitate geocodings described herein. Mobile device 400 can also include a camera lens and sensor 480. In some implementations, the camera lens and sensor 480 can be located on the back surface of the mobile device 400. The camera can capture still images and/or video for association with captured pitch-corrected vocals.

Mobile device 400 can also include one or more wireless communication subsystems, such as an 802.11b/g communication device, and/or a Bluetooth™ communication device 488. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc. A port device 490, e.g., a Universal Serial Bus (USB) port, or a docking port, or some other wired port connection, can be included and used to establish a wired connection to other computing devices, such as other communication devices 400, network access devices, a personal computer, a printer, or other processing devices capable of receiving and/or transmitting data. Port device 490 may also allow mobile device 400 to synchronize with a host device using one or more protocols, such as, for example, the TCP/IP, HTTP, UDP and any other known protocol.

Figure 5:
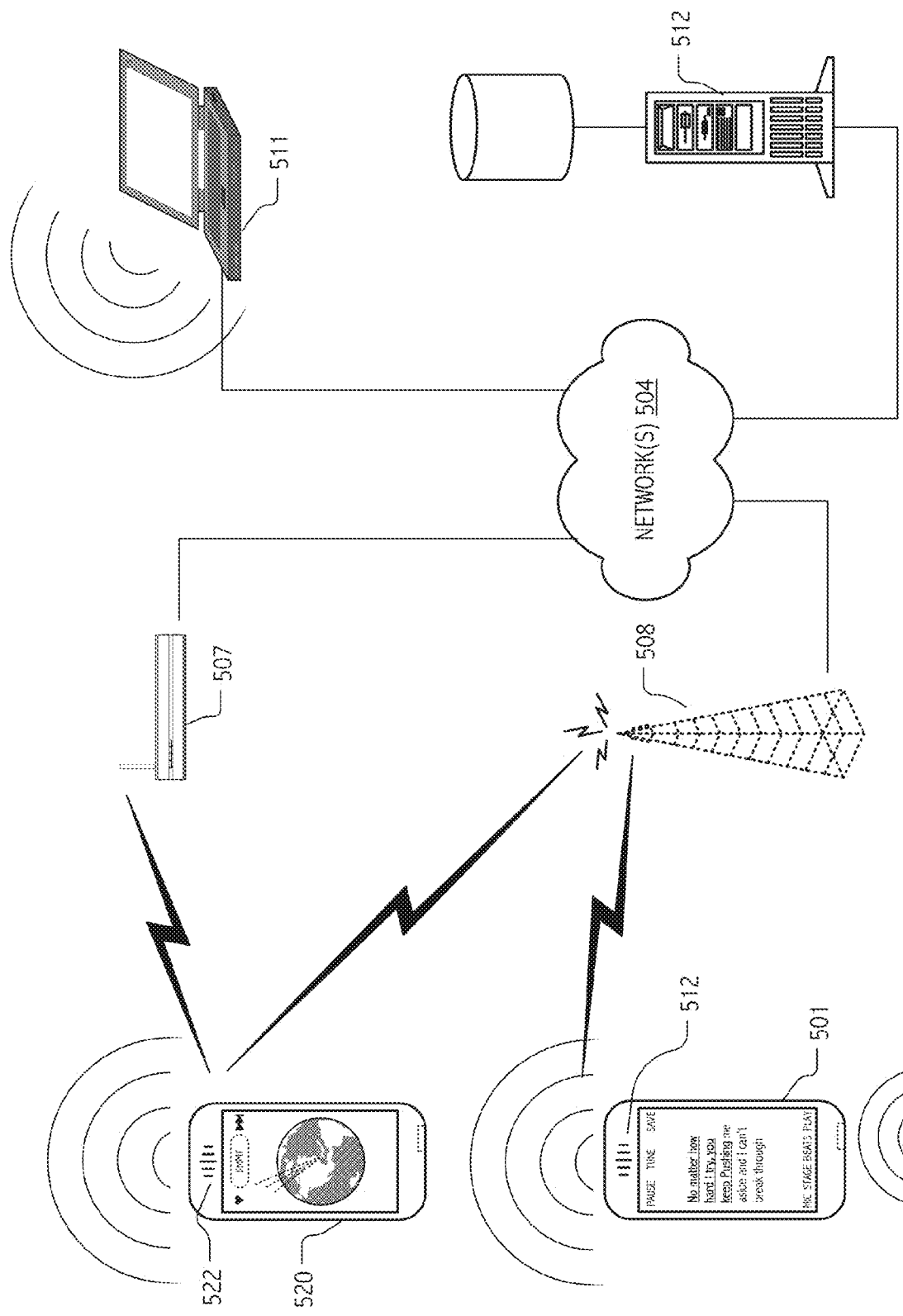
FIG. 5 is a network diagram that illustrates cooperation of exemplary devices in accordance with some embodiments of the present invention.

FIG. 5 illustrates respective instances (501 and 520) of a portable computing device such as mobile device 400 programmed with user interface code, pitch correction code, an audio rendering pipeline and playback code in accord with the functional descriptions herein. Device instance 501 operates in a vocal capture and continuous pitch correction mode, while device instance 520 operates in a listener mode. Both communicate via wireless data transport and intervening networks 504 with a server 512 or service platform that hosts storage and/or functionality explained herein with regard to content server 110, 210. Captured, pitch-corrected vocal performances may (optionally) be streamed from and audibly rendered at laptop computer 511.

Other Embodiments

While the invention(s) is (are) described with reference to various embodiments, it will be understood that these embodiments are illustrative and that the scope of the invention(s) is not limited to them. Many variations, modifications, additions, and improvements are possible. For example, while pitch correction vocal performances captured in accord with a karaoke-style interface have been described, other variations will be appreciated. Furthermore, while certain illustrative signal processing techniques have been described in the context of certain illustrative applications, persons of ordinary skill in the art will recognize that it is straightforward to modify the described techniques to accommodate other suitable signal processing techniques and effects. In particular, where implementations and/or illustrative applications have been described relative to plug-ins and Auto-Tune® audio processing techniques developed by Antares Audio Technologies and popularized by performance effects of artists such as T-Pain, persons of ordinary skill in the art will recognize, based on the description herein, that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile device or portable computing device) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
   using a portable computing device for vocal performance capture, the portable computing device having a display, a microphone interface and a data communications interface;
   retrieving via the data communications interface at least lyrics and timing information corresponding to a backing track;
   at the portable computing device, audibly rendering a first encoding of the backing track and concurrently presenting the retrieved lyrics on the display in accord with the timing information;
   at the portable computing device, capturing and pitch correcting a vocal performance of a user in accord with pitch correction settings; and
   distorting the vocal performance capture in accord with an applied effect in correspondence with user interface gestures by the user, wherein a user interface gesture dynamically switches back and forth between melody and harmony note sets as operant pitch correction settings.

2. The method of claim 1,
   storing an audio encoding of the pitch-corrected vocal performance to a local storage of the portable computing device.

3. The method of claim 1,
   wherein the pitch correction settings include score-coded note targets.

4. The method of claim 3,
   wherein a first user interface gesture switches off use of the score-coded note targets.

5. The method of claim 4,
   wherein a second user interface gesture switches on use of the score-coded note targets.

6. The method of claim 1,
   transmitting from the portable computing device to a remote server via the communications interface, an audio encoding of the pitch-corrected vocal performance for mixing with a second encoding of the backing track.

7. The method of claim 6,
   wherein the second encoding is of higher quality or fidelity than the first encoding.

8. The method of claim 1,
   wherein the pitch correction settings are specific to a particular artist.

9. A portable computing device comprising:
   a display;
   a microphone interface;
   a data communications interface;
   code executable on the portable computing device to retrieve via the data communications interface at least lyrics and timing information corresponding to a backing track;
   code further executable on the portable computing device to audibly render a first encoding of the backing track and concurrently present the retrieved lyrics on the display in accord with the timing information;
   code further executable on the portable computing device to capture and pitch correct a vocal performance of a user in accord with pitch correction settings; and
   code further executable on the portable computing device to distort the vocal performance capture in accord with an applied effect in correspondence with user interface gestures by the user, wherein a user interface gesture dynamically switches back and forth between melody and harmony note sets as operant pitch correction settings.

10. The system of claim 9, further comprising:
    code further executable on the portable computing device to store an audio encoding of the pitch-corrected vocal performance to a local storage of the portable computing device.

11. The system of claim 9,
    wherein the pitch correction settings include score-coded note targets.

12. The system of claim 11,
wherein a first user interface gesture switches off use of the score-coded note targets.

13. The system of claim 12,
wherein a second user interface gesture switches on use of the score-coded note targets.

14. The system of claim 9,
code further executable on the portable computing device to transmit from the portable computing device to a remote server via the communications interface, an audio encoding of the pitch-corrected vocal performance for mixing with a second encoding of the backing track.

15. The system of claim 14,
wherein the second encoding is of higher quality or fidelity than the first encoding.

16. The system of claim 9, wherein the portable computing device is selected from the group of:
a mobile phone;
a personal digital assistant; and
a laptop computer, notebook computer, a pad-type computer or netbook.

17. The method of claim 1, wherein a second user interface gesture causes modification of the pitch correction settings.

18. The system of claim 9, wherein a second user interface gesture causes modification of the pitch correction settings.

* * * * *